US007353998B2

(12) United States Patent
Bechtel et al.

(10) Patent No.: US 7,353,998 B2
(45) Date of Patent: Apr. 8, 2008

(54) IMAGE PROCESSING SYSTEM RECEIVING SIMULTANEOUS SCAN REQUESTS FROM MULTIPLE SCANNERS

(75) Inventors: Thomas Bechtel, Lexington, KY (US); Joshua E. Ellingsworth, Lexington, KY (US); Michael L. Whitlock, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 462 days.

(21) Appl. No.: 11/021,660

(22) Filed: Dec. 22, 2004

(65) Prior Publication Data

US 2006/0132838 A1 Jun. 22, 2006

(51) Int. Cl.
G06F 17/00 (2006.01)
G06F 19/00 (2006.01)
G06K 7/00 (2006.01)
(52) U.S. Cl. .................................. 235/462.15; 358/2.1
(58) Field of Classification Search ........... 235/462.15, 235/438, 462.25, 462.01, 470; 358/1.15, 358/1.6, 2.1
See application file for complete search history.

(56) References Cited

U.S. PATENT DOCUMENTS

| 3,647,949 | A | | 3/1972 | Closs et al. |
| 4,454,575 | A | | 6/1984 | Bushaw et al. |
| 4,894,522 | A | * | 1/1990 | Elliott .................... 235/462.15 |
| 5,914,474 | A | * | 6/1999 | Spitz ........................... 235/438 |
| 6,195,172 | B1 | | 2/2001 | Minamizawa |
| 6,243,769 | B1 | | 6/2001 | Rooney |
| 6,301,611 | B1 | | 10/2001 | Matsumoto et al. |
| 6,412,022 | B1 | | 6/2002 | Kumpf et al. |
| 6,487,611 | B1 | | 11/2002 | Brusky et al. |
| 6,529,978 | B1 | | 3/2003 | Eide et al. |
| 6,604,157 | B1 | | 8/2003 | Brusky et al. |
| 6,883,046 | B2 | * | 4/2005 | Shih et al. .................... 710/62 |
| 7,012,706 | B1 | * | 3/2006 | Hansen ...................... 358/1.15 |
| 2004/0015624 | A1 | | 1/2004 | Shih et al. |
| 2004/0046983 | A1 | | 3/2004 | Sodhi |
| 2004/0111544 | A1 | | 6/2004 | Bennett et al. |

FOREIGN PATENT DOCUMENTS

EP 1198122 A2 4/2004

* cited by examiner

Primary Examiner—Thien M. Le
Assistant Examiner—Edwyn Labaze
(74) Attorney, Agent, or Firm—Taylor & Aust, PC

(57) ABSTRACT

In a system comprising at least one scanner in communication with a computer said computer having plurality of process instantiable therein, said processes including a plurality scanning processes, a communications layer, and monitoring software, said instantiable processes being in communication with one another when instantiated, and said communication layer being in communication with said at least one scanner when instantiated, a method of operating an image processing system, comprising: instantiating the monitoring software, receiving a device scan request at said communication layer from at least one said scanner; associating at said communication layer a unique identifier to said device scan request identifying said at least one scanner from which the device scan request was received; transmitting said device scan request and said corresponding unique identifier to said monitoring software; and instantiating one said scanning process dependent upon said device scan request and said corresponding unique identifier.

19 Claims, 3 Drawing Sheets

IMAGE PROCESSING SYSTEM RECEIVING SIMULTANEOUS SCAN REQUESTS FROM MULTIPLE SCANNERS

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates to image processing systems, and, more particularly, to such systems including a computer coupled with multiple scanners.

2. Description of the Related Art

Computer peripheral equipment provides various desired functionality to an attached computer, such as faxing, scanning, printing, copying, etc. To save space, cost, etc., it has become more common to include multiple functions in a single peripheral device. These are often referred to as multi-function machines (MFM) or all-in-one machines (AIO), which terms are used interchangeably herein. Some of the multi-function machines provide the ability to scan an image and transmit the scanned image to a local or network attached computer.

Current typical scan application software is meant to support only a single scan operation at any point in time. Such scan application software is typically designed for communication only with a single local scanner 10 attached via a USB connection 11 to a computer 12 (see FIG. 1).

When a scan to host operation is requested from the scanner 10, a request to scan along with parameter information (such as resolution) is sent to the monitoring software 13 via the communication layer 14. Software 15 on the Personal Computer (PC) processes the scan request and initiates the scan (see FIG. 2).

Networks and higher-end workstations permit a PC to connect to multiple devices at the same time. In an environment such as a small business, a centralized PC 30 is often times set up and connected to multiple peripheral devices. Local scanners 31 and 32 are connected through USB connections 33 and 34, respectively, to PC 30 and network attached scanners 33, 34, and 35 and connected to network adapters 38, 39, and 40, respectively that are in turn connected via an Ethernet connection 41 to PC 30. (See FIG. 3). In this environment simultaneous scan requests can occur. For example, suppose user A starts a scan from scanner 35 to a PC 30, and then user B starts a scan from scanner 32 to the PC 30. Since user A is already in the process of scanning to the PC 30, the scanning application software installed on PC 30 will not process the scan request from user B.

It is important to note that the PC and communication layer can communicate with multiple scanners simultaneously; however, the scan application software does not allow for unique processing.

What is needed in the art is an image processing system and method which can receive and process simultaneous multiple scan requests.

SUMMARY OF THE INVENTION

The present invention provides simultaneous scanning on a single PC using software that treats each device scan request in a separate process and has a unique device handle for communication with the attached device.

The invention comprises, in one form thereof, in a system comprising at least one scanner in communication with a computer said computer having plurality of process instantiable therein, said processes including a plurality scanning processes, a communications layer, and monitoring software, said instantiable processes being in communication with one another when instantiated, and said communication layer being in communication with said at least one scanner when instantiated, a method of operating an image processing system, comprising: instantiating the monitoring software, receiving a device scan request at said communication layer from at least one said scanner; associating at said communication layer a unique identifier to said device scan request identifying said at least one scanner from which the device scan request was received; transmitting said device scan request and said corresponding unique identifier to said monitoring software; and instantiating one said scanning process dependent upon said device scan request and said corresponding unique identifier.

With the present invention the computer can receive and process simultaneous device scan requests and initiate scans at corresponding scanners. Another aspect of the invention is that the simultaneous scans can be carried out through local or network attached scanners. Yet another aspect of the invention is that each device scan request is associated with a particular scanner attached to the computer.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
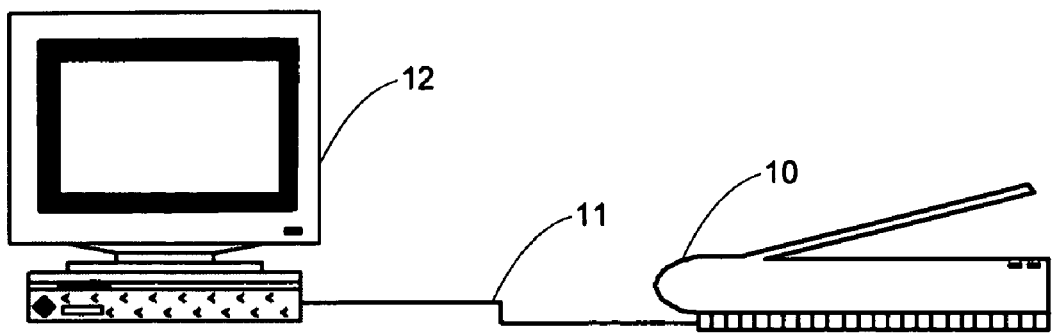
FIG. 1 is a schematic illustration of prior art image processing system including a computer coupled with a locally attached scanner.
Figure 2:
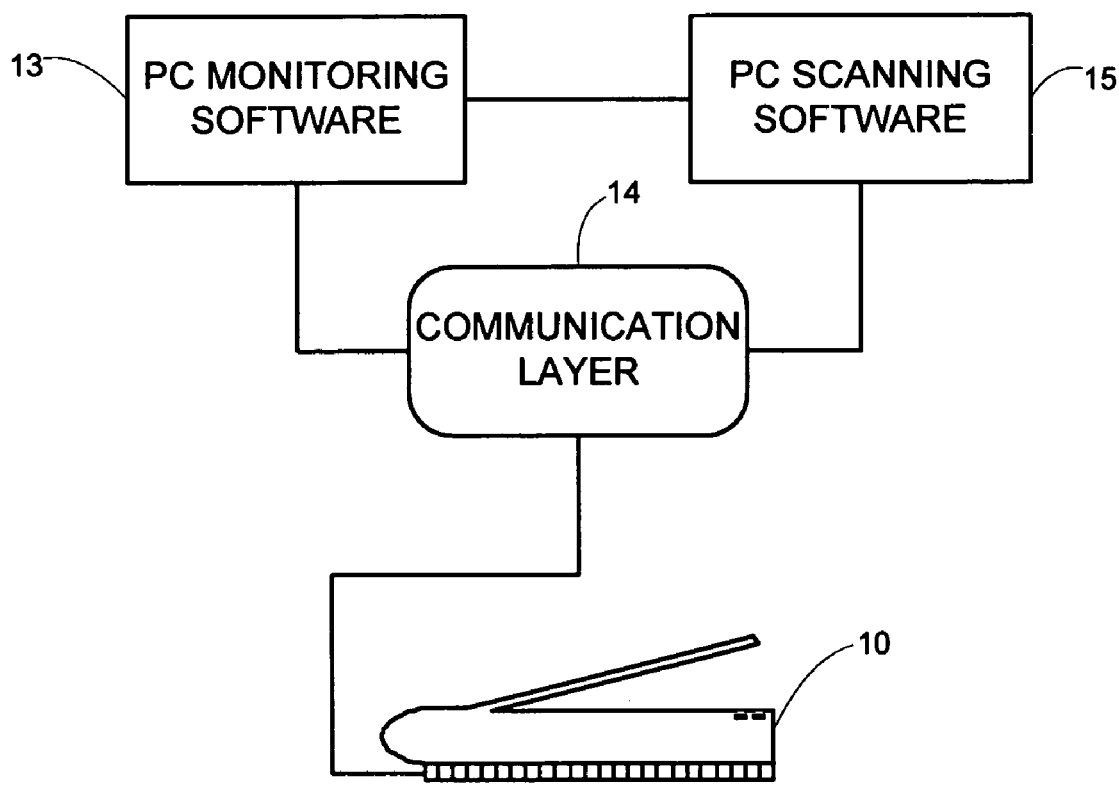
FIG. 2 is a schematic illustration of the prior art image processing system of FIG. 1, illustrating in more detail the functional components of the computer coupled with the locally attached scanner.
Figure 3:
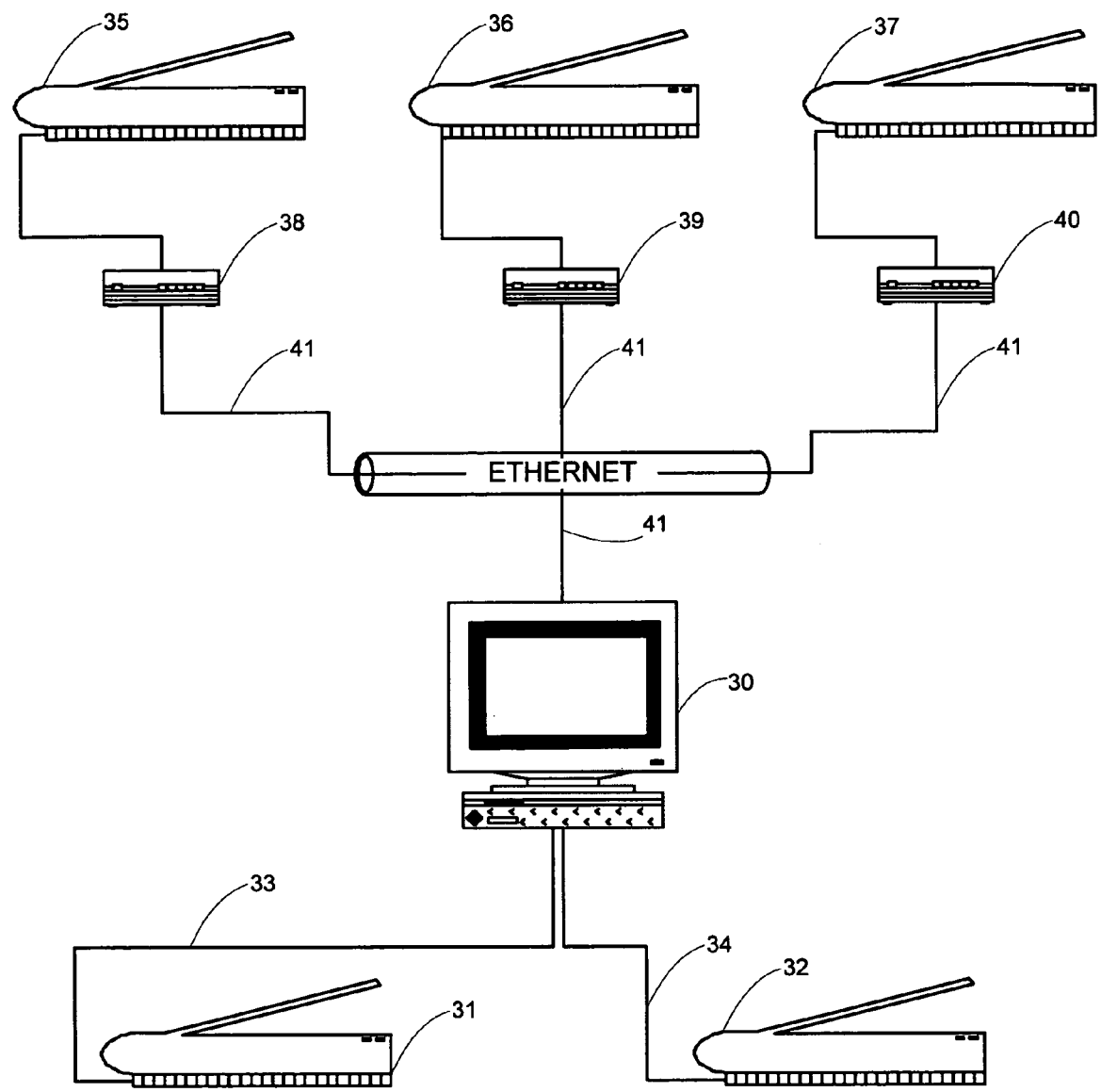
FIG. 3 is a schematic illustration of a prior art image processing system including a computer coupled with multiple scanners both locally and over a network.
Figure 4:
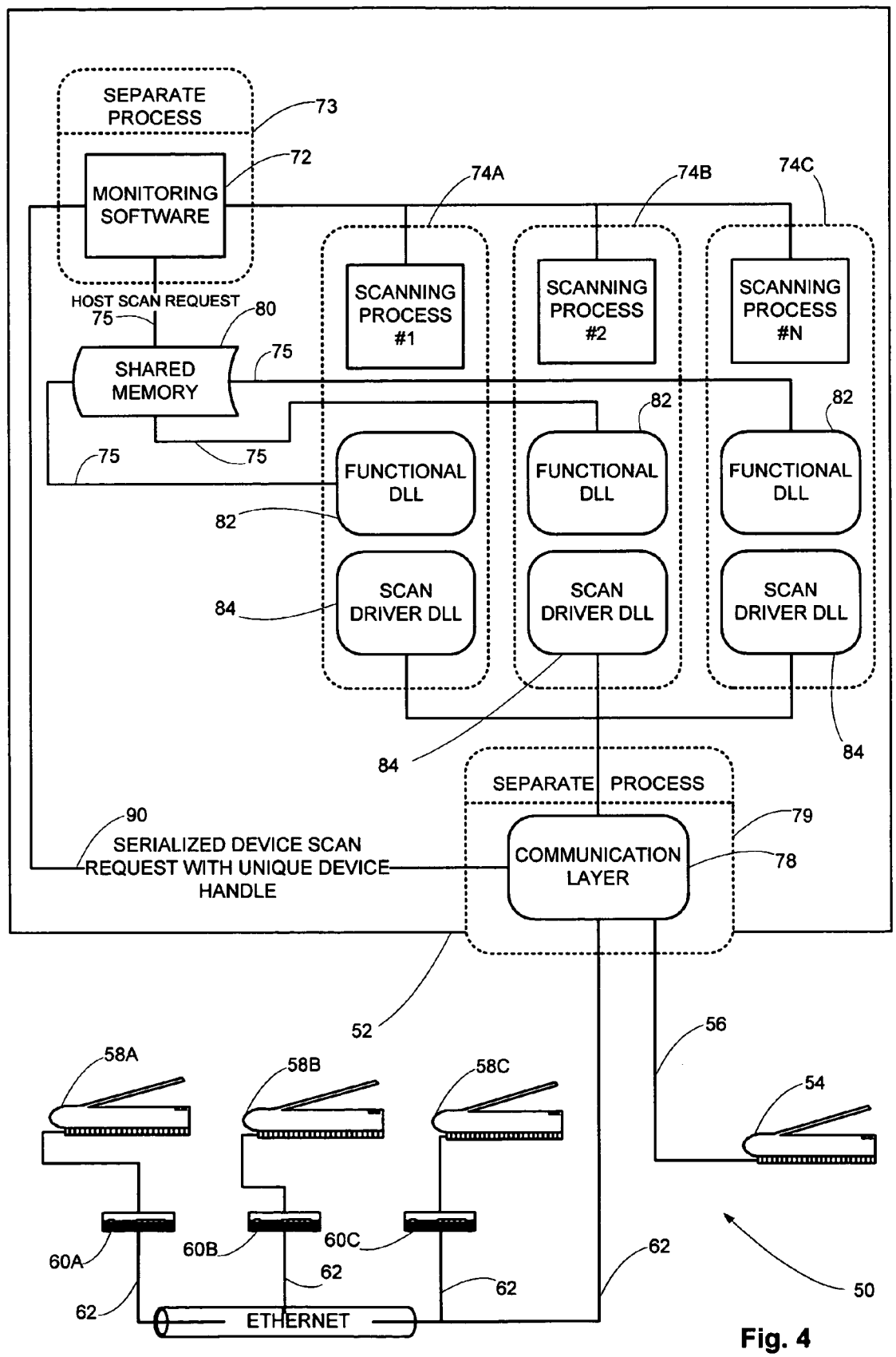
FIG. 4 is a schematic illustration of an image processing system of the present invention showing the architectural layout of the computer coupled with multiple scanners.

Referring now to the drawings and particularly to FIG. 4, there is shown an embodiment of an image processing system 50 of the present invention showing the architectural layout of computer 52 coupled with multiple scanners, including a local scanner 54 attached via a USB connection 56 and a plurality of network attached scanners 58A, 58B and 58C. Scanners 58A-C, are illustratively shown connected to network adapters 60A-C respectively, that in turn are connected via Ethernet connection 62 to computer 52. Computer 52 is in the form of a PC but may also be a different type of computer. Scanners 54 and 58A-C can be stand alone scanners or incorporated into a corresponding MFM. Further, the number of locally and/or network attached scanners can vary depending on the application. Moreover, it will be understood that the various components of image processing system 50 can be configured using hardware, firmware and/or software.

Computer 52 includes a memory 80 and a plurality of instantiated processes including a communication layer 70, monitoring software 72, a plurality of scanning processes 74A, 74B and 74C. Communication layer 78 is configured to carry out simultaneous two way communication with scanners 54 and 58A-C. Communication layer 78 may be incorporated integrally within PC 52 as shown, or may be partially or entirely outside PC 52 but in communication with PC 52.

Monitoring software 72, instantiated in a separate process indicated by dotted-line box 73, can be in any suitable computer code and is configured to monitor for a device scan request from any of scanners 54 and 58A-C, by way of communication layer 78, shown instantiated in another separate process indicated by dotted-line box 79. Computer resources are a limiting factor to the number of simultaneous device scan requests which can be received and processed. There is no fixed limit to the number of device scan requests that can be processed based on the present invention.

Memory 80 is in communication with monitoring software 72 and each of the plurality of instantiated scanning processes 74A-C where scanning process 74C represents the nth scanning processing. Each scanning process 74A-C includes a functional dynamic link library (DLL) 82 and a scan driver DLL 84. Each scan driver DLL 82 corresponds to scan driver software for a different one of the plurality of scanners 54 and 58A-C, which could be the same or different type of scanner. Each instantiated scanning process 74A-C is in communication with each of communication layer 78, monitoring software 72, and memory 80.

During operation, monitoring software 72 monitors for device scan requests from both locally attached scanner 54 and network attached scanners 58A-C via communication layer 78. When a device scan request is sent from a scanner 54 or 58A-C to PC 52, communication layer 78 receives the device scan request and associates a unique device identifier (handle) with the device scan request. This handle can then be use to uniquely identify the particular scanner for subsequent communication. As shown at 90, the device scan request with its unique associated handle is then sent serialized via a callback method to monitoring software 72.

Once the serialized device scan request is received from communication layer 78, the monitoring software 72 constructs a host scan request 75 understood by the functional DLL 82 of scanning processes 74A-C. This host scan request is stored in a shared memory data location within memory 80 recognized by the operating system of the PC. The functional DLL 82 is then executed in a separate process, such as for example process 74A, running on the PC 52, which then reads the host scan request 75 from the location in shared memory 80 and invokes the scanning software to perform the scan via the scan driver DLL 84 on the scanner requesting it. Because each host scan request 75 performed by the functional DLL 82 and scan driver DLL is executed in a unique process, and the scanning software has a unique device handle associated with each device scan request, simultaneous device scans are possible from a single PC.

Subsequently, PC 52 may receive a second device scan request at communication layer 78 from another scanner 54 or 58A-C. Communication layer 78 assigns a second unique identifier to the second device scan request identifying the particular scanner 54 or 58A-C from which the second device scan request was received. The second device scan request and corresponding second unique identifier are transmitted from communication layer 78 to monitoring software 72. Monitoring software 20 generates another host scan request and stores the other host scan request in memory 80. An other scanning process, which may be the same or a different scanning process, is invoked dependent upon the other host scan request stored in memory 80. This process can repeat for as many new device scan requests are received from scanners 54 and/or 58A-C.

The present invention allows the user of PC 52 to perform multiple simultaneous scans from both locally attached and network attached scanners. By designing the scanning software to perform scans in a unique process space, and allowing for device communication via a unique device handle, PC 52 can conduct as many simultaneous device scans as possible given the PC resources.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. In a system comprising at least one scanner in communication with a computer, said computer having a plurality of processes instantiable therein, said processes including a plurality of scanning processes including a first scanning process and a second scanning process, a communications layer, and monitoring software, said instantiable processes being in communication with one another when instantiated, and said communication layer being in communication with said at least one scanner when instantiated, a method of operating an image processing system, comprising:

instantiating the monitoring software;
receiving a first device scan request and a second device scan request at said communication layer from at least one said scanner, said second device scan request being received before said first scanning process is completed by the method;
associating at said communication layer a unique identifier to said device scan request identifying said at least one scanner from which the device scan request was received;
transmitting said device scan request and said corresponding unique identifier to said monitoring software;

instantiating said first scanning process dependent upon said first device scan request and said corresponding unique identifier; and instantiating said second scanning process dependent upon said second device scan request and said corresponding unique identifier, said first scanning process being different from said second scanning process.

2. The method of operating the image processing system of claim 1, the image processing system further including the step of providing a memory in communication with said monitoring software and each of said plurality of scanning processes.

3. The method of operating the image processing system of claim 2, wherein each said scanning process includes a functional dynamic link library and a scan driver dynamic link library, and the method further comprises:

generating a host scan request with said monitoring software dependent upon said transmitted device scan request and its associated unique identifier;

storing said host scan request in said memory; and instantiating said one scanning process dependent upon said host scan request stored in said memory.

4. The method of operating the image processing system of claim 1, wherein said plurality of scanning processes are in communication with each of said monitoring software and said communication layer, and the method further comprises initiating a scan on said at least one scanner using said instantiated scanning process through said communication layer.

5. The method of operating the image processing system of claim 4, wherein each said scanning process includes a functional dynamic link library, and a scan driver dynamic link library.

6. The method of operating the image processing system of claim 5, wherein said at least one scanner includes a plurality of scanners, and wherein each of said plurality of scanners requesting a scan has a corresponding instantiated scanning process containing said scan driver dynamic link library corresponding to the requesting scanner being processed.

7. The method of operating the image processing system of claim 1, wherein said at least one scanner includes a plurality of scanners, and the method further comprises:

receiving a second device scan request at said communication layer from a second said scanner;

assigning at said communication layer a second unique identifier to said second device scan request identifying said second scanner from which the second device scan request was received;

transmitting said second device scan request and said corresponding second unique identifier to said monitoring software; and instantiating a second said scanning process dependent upon said second device scan request and said second unique identifier.

8. The method of operating the image processing system of claim 7, wherein each said scanning process includes a functional dynamic link library, and a scan driver dynamic link library.

9. The method of operating the image processing system of claim 8, wherein each said scan driver dynamic link library corresponds to scan driver software for the scanner whose scan request is being processed.

10. The method of operating the image processing system of claim 1, wherein each said scanner is in communication with said communication layer via one of a local connection and a network connection.

11. The method of operating the image processing system of claim 1, wherein each at least one of said scanners is in communication with said communication layer via one of a local connection and at least another one of said scanners is in communication with said communication layer via a network connection.

12. In a system comprising a plurality of scanners including a first scanner and a second scanner each in communication with a computer, said computer having a memory and a plurality of process instantiable therein, said processes including a plurality of scanning processes including a first scanning process and a second scanning process, a communications layer, and monitoring software, said instantiable processes being in communication with said one another when instantiated, said instantiable scanning processes and monitoring software when instantiated being in communication with said memory, and said communication layer being in communication with each of the plurality of scanners when instantiated, a method of operating an image processing system, comprising:

instantiating the monitoring software;

receiving a first device scan request at said communication layer from said first scanner;

assigning at said communication layer a unique identifier to said first device scan request identifying said requesting scanner;

transmitting said first device scan request and said corresponding unique identifier to said monitoring software;

instantiating for said requesting scanner via said monitoring software said first scanning process dependent upon said first device scan request and said corresponding unique identifier;

initiating a scan on said requesting scanner using said instantiated first scanning process;

receiving a second device scan request at said communication layer from said second scanner;

assigning at said communication layer a unique identifier to said second device scan request identifying said requesting scanner;

transmitting said second device scan request and said corresponding unique identifier to said monitoring software;

instantiating for said requesting scanner via said monitoring software said second scanning process dependent upon said second device scan request and said corresponding unique identifier; and initiating a scan on said requesting scanner using said instantiated second scanning process, said second device scan request being at least received and assigned prior to said first device scan request being initiated.

13. The method of operating the image processing system of claim 12, wherein each said instantiated scanning process includes a functional dynamic link library and a scan driver dynamic link library, and the method further comprises:

generating a host scan request with said monitoring software dependent upon said transmitted device scan request and corresponding unique identifier;

storing said host scan request in said memory; and instantiating said one scanning process dependent upon said host scan request stored in said memory.

14. The method of operating an image processing system of claim 13, wherein each said scan driver dynamic link library corresponds to scan driver software for a different one of said plurality of scanners.

15. The method of operating an image processing system of claim 12, wherein each said scanning process includes a functional dynamic link library, and a scan driver dynamic link library.

16. The method of operating an image processing system of claim 15, wherein each said scan driver dynamic link library corresponds to scan driver software for a different one of said plurality of scanners.

17. The method of operating an image processing system of claim 12, wherein each said scanner is in communication with said communication layer via one of a local connection and a network connection.

18. In a system comprising a plurality of scanners in communication with a computer, said computer having memory and a plurality of processes instantiable therein, said processes including a plurality of scanning processes including a first scanning process and a second scanning process, a communications layer, and monitoring software, said instantiable processes being in communication with said one another when instantiated, said instantiable scanning processes and monitoring software when instantiated being in communication with said memory, and said communication layer being in communication with each of the plurality of scanners when instantiated, a method of operating an image processing system, comprising:

instantiating the monitoring software;

receiving a plurality of device scan requests including a first scan request and a second scan request at said communication layer from at least one of said plurality of scanners; and for said first device scan request:

assigning at said communication layer a unique identifier to each received device scan request identifying said requesting scanner;

transmitting each said device scan request and said corresponding unique identifier to said monitoring software;

instantiating for said applicable requesting scanner via said monitoring software one of said plurality of scanning processes dependent upon said device scan request and said corresponding unique identifier, said instantiated scanning process having a functional DLL;

initiating a scan on said applicable requesting scanner and retrieving said host scan request from memory for use with said functional DLL in said instantiated scanning process; and for said second device scan request:

assigning at said communication layer a unique identifier to each received device scan request identifying said requesting scanner;

transmitting each said device scan request and said corresponding unique identifier to said monitoring software;

instantiating for said applicable requesting scanner via said monitoring software one of said plurality of scanning processes dependent upon said device scan request and said corresponding unique identifier, said instantiated scanning process having a functional DLL; and initiating a scan on said applicable requesting scanner and retrieving said host scan request from memory for use with said functional DLL in said instantiated scanning process, said second device scan request being assigned in said assigning step and transmitted in said transmitting step prior to said first device scan request being completed.

19. The method of operating the image processing system of claim 18, wherein each said instantiated scanning process includes a functional dynamic link library and a scan driver dynamic link library, and the method further comprises:

for each uniquely identified device scan request:

generating a host scan request with said monitoring software dependent upon said transmitted scan request and corresponding unique identifier;

storing said host scan request in said memory; and instantiating said one scanning process dependent upon said host scan request stored in said memory then initiating said scan on said applicable requesting scanner.

* * * * *